United States Patent [19]

Perelman et al.

[11] Patent Number: 5,563,881
[45] Date of Patent: Oct. 8, 1996

[54] MULTIHOP DISTRIBUTION LISTS

[75] Inventors: Roberto Perelman; Mark E. Kaminsky, both of Sunnyvale, Calif.

[73] Assignee: Rolm Company, Santa Clara, Calif.

[21] Appl. No.: 501,762

[22] Filed: Jul. 13, 1995

Related U.S. Application Data

[63] Continuation of Ser. No. 103,464, Aug. 6, 1993, abandoned.

[51] Int. Cl.$^6$ ................................................ H04L 12/54
[52] U.S. Cl. .................................... 370/61; 370/94.1
[58] Field of Search ............................. 370/60, 61, 94.1, 370/94.3, 92, 85.5, 85.12, 85.13, 85.14, 85.15, 54; 340/825.52, 825.05

[56] References Cited

U.S. PATENT DOCUMENTS

| | | | |
|---|---|---|---|
| 4,081,612 | 3/1978 | Hafner | 370/60 |
| 4,621,362 | 11/1986 | Sy | 370/85.14 |
| 5,003,533 | 3/1991 | Watanabe | 370/85.15 |
| 5,142,531 | 8/1992 | Kirby | 370/94.3 |
| 5,150,360 | 9/1992 | Perlman et al. | 370/85.13 |
| 5,245,607 | 9/1993 | Caram | 370/94.3 |
| 5,280,477 | 1/1994 | Trapp | 370/92 |
| 5,291,302 | 3/1994 | Gordon et al. | 370/61 |
| 5,337,307 | 8/1994 | Sato et al. | 370/60 |

Primary Examiner—Benedict V. Safourek
Assistant Examiner—Chau T. Nguyen

[57] ABSTRACT

Method and apparatus for use in a network of store and forward messaging system sites which avoid infinite loops while providing user access to distribution lists in the network, the members of which distribution lists are users and distribution lists located at other network sites. In accordance with the present invention, a data field is added to data transmited with a message from site to site in the network. This data field provides information which identifies sites in the network that the message has "visited." Upon creation of a message, the field is empty. Then, as the message is transmitted from a transmitting site to a receiving site, identification of the transmitting site is added to the field. Whenever a message arrives at a site, and an examination of the data field shows that the message has already been at that site, the message is not transmitted to remote sites; i.e., only local addressees receive the message. Alternatively, identification of the receiving site is added to the field, and the message is not transmitted from one site to any other site whose identification is included in the field.

19 Claims, 4 Drawing Sheets

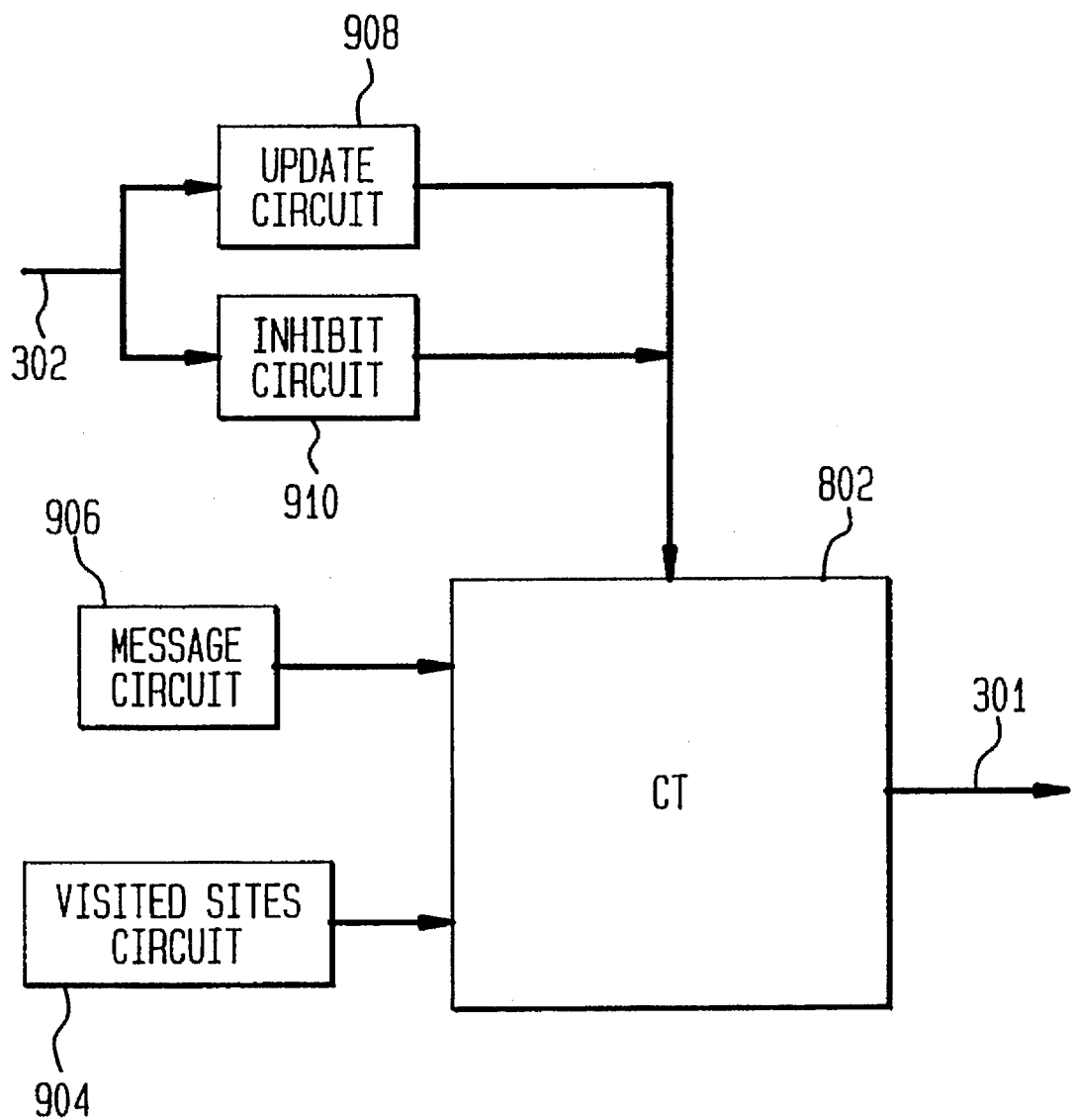

MULTIHOP DISTRIBUTION LISTS

CROSS-REFERENCE TO RELATED APPLICATION

This is a continuation of Ser. No. 08/103,464 filed Aug. 6, 1993, abandoned.

TECHNICAL FIELD OF THE INVENTION

The present invention relates, in general, to the field of store and forward messaging system networks and, in particular, to method and apparatus for sending messages to distribution lists defined at sites in the network. Specifically, the present invention relates to method and apparatus for sending a message to a distribution list at a network site where members of the distribution list comprise: (a) users at the site where the distribution list is defined; (b) users at other network sites, and/or (c) distribution lists located at other network sites.

BACKGROUND OF THE INVENTION

Networks of store and forward messaging systems such as, for example, networks of store and forward voice and/or data messaging systems are well known in the art. As is well known, such networks are typically comprised of a group of individual store and forward systems which are interconnected by communications links into a network. A user of such a network of store and forward messaging systems is typically, but not necessarily, a human (sometimes referred to as a user) who "owns" a mailbox at the user's local system (sometimes referred to as a local site or a home site). As is well known, a mailbox is a logical abstraction in a store and forward messaging system at which a user's messages are stored and which is seen by the user as a single logical storage area. Users may create messages (a message is a group of information and can be a voice message, a data message, a facsimile message, a combination of voice, data, and facsimile information, and so forth) which are sent from their mailboxes to other mailboxes. Mailboxes on the user's local site are called local mailboxes and mailboxes on other sites are called network mailboxes. Users may receive messages which are transmitted to their mailboxes.

As is well known, a distribution list is a list of members (a member of the distribution list is sometimes referred to as a destination), which members may either be users or other distribution lists. In prior art systems, whenever a message is addressed to a distribution list, the message is redistributed, or not, as the site permits, separately to each destination in the distribution list (a redistribution of messages in a distribution list is sometimes referred to as an expansion of the distribution list). For the purpose of describing the present invention, a message received at one site in the network from another site in the network is referred to as a "network message" and a message which has never left a local site is called a "local message."

In a typical prior art network of store and forward messaging system sites, a user provides the address of a mailbox for message delivery and each site is able to determine whether the mailbox is local or not. Further, each site is able to determine the site in the network to which a message is to be sent if the mailbox is not local. In general, however, a site cannot determine whether a network mailbox refers to a user or to a distribution list. Further, in the case of a distribution list, a site cannot determine whether a member which is a network mailbox refers to a user or to a distribution list.

In a typical prior art network of store and forward messaging system sites, in order to prevent infinite loops of message delivery from occurring, network messages, i.e., messages received at a site from another site in the network, are restricted in that they may only be automatically distributed to users at the reception site. A user who receives a network message can, if the site permits, forward that message to any site in the network, and that message, directed by the user, is treated as a new message. In contrast, a network message addressed to a distribution list can only be automatically expanded to addresses or destinations, i.e., mailboxes, at the local site where the distribution list resides. Further, in such a typical prior art network, a maximum depth of nesting of distribution lists within a site is imposed. Nesting means that a message is sent to a distribution list at a site which redistributes it, in turn, to another distribution list at the same site. However, in accordance with a nesting restriction, if the message reaches the maximum depth of nesting of distribution lists for a site, the message is only further expanded or distributed to users, i.e., sent to users' mailboxes, and not to further distribution lists. The above-described restrictions are used in the prior art to prevent infinite loops which would be caused, for example, by two distribution lists, each containing the other (among, possibly, other destinations) as a destination.

The above-described prior art systems have several disadvantages. In particular, a user who sends messages to recipients who are scattered across such a prior art network can only use a distribution list defined at the user's home site or the destinations local to the site of a distribution list at another site. This is disadvantageous in that it requires duplication of commonly used distribution lists which contain destinations at more than one site. This is further disadvantageous in that administration of such distribution lists, for example, to keep track of changes, grows rapidly with the number of sites in the network. As an example, consider a company which has many sites -with a vice president at each site. In using one of the above-described prior art systems, one would have to set up a separate distribution list for each site to distribute a message to all vice presidents of the company. Maintaining such distribution lists, for example, if one vice president temporarily relocates to a different site or changes his/her address (mailbox number), requires much administrative effort.

A still further disadvantage of the above-described prior art systems is that a user cannot design distribution lists which minimize message transmission costs. To understand this, assume that a user, for example, an engineer, working for a multinational company in the United States of America wishes to send a message to his/her colleagues, for example, an engineering group, at different sites in Europe. The least expensive way to do this is to send a single copy of the message to a site in Europe, where a distribution list would then distribute the message to all the European destinations. This is not allowed because the distribution list would need to expand to destinations at other sites. Instead, the user would use a locally is defined distribution list which would be expanded at his/her local site. As a result, a separate copy of the message would be sent to each of the different sites, thereby incurring a high transmission cost.

In light of the above, there is a need in the art for method and apparatus for use in a network of store and forward messaging system sites which avoid infinite loops while providing user access to distribution lists in the network, the members of which distribution lists are users and distribution lists which may be located at other network sites.

SUMMARY OF THE INVENTION

Advantageously, embodiments of the present invention are method and apparatus for use in a network of store and forward messaging system sites which avoid infinite loops while providing user access to distribution lists in the network, the members of which distribution lists are users and distribution lists which may be located at other network sites.

In particular, an embodiment of the inventive method for use in a network of store and forward messaging system sites for providing user access to distribution lists in the network, the members of which distribution lists are: (a) users and/or (b) distribution lists located at the same or other network sites comprises the steps of: (a) whenever a user creates a message at a transmitting system site in the network, creating and clearing a VisitedSites data field; (b) before transmitting or receiving a message from a transmitting system site in the network to a recipient system site in the network, checking the VisitedSites data field to determine whether an identifier of the transmitting network site is included therein: (i) if the identifier is not included therein, updating the VisitedSites data field to include the identifier of the transmitting system site and transmitting the VisitedSites data field with the message; and (ii) if the identifier is included therein, inhibiting transmission of the message to the recipient system site whenever the recipient system site is different from the transmitting system site.

BRIEF DESCRIPTION OF THE DRAWING

FIG. 5 shows a block diagram of the transmitting and processing apparatus of one of the sites of FIG. 1.

DETAILED DESCRIPTION

Figure 1:
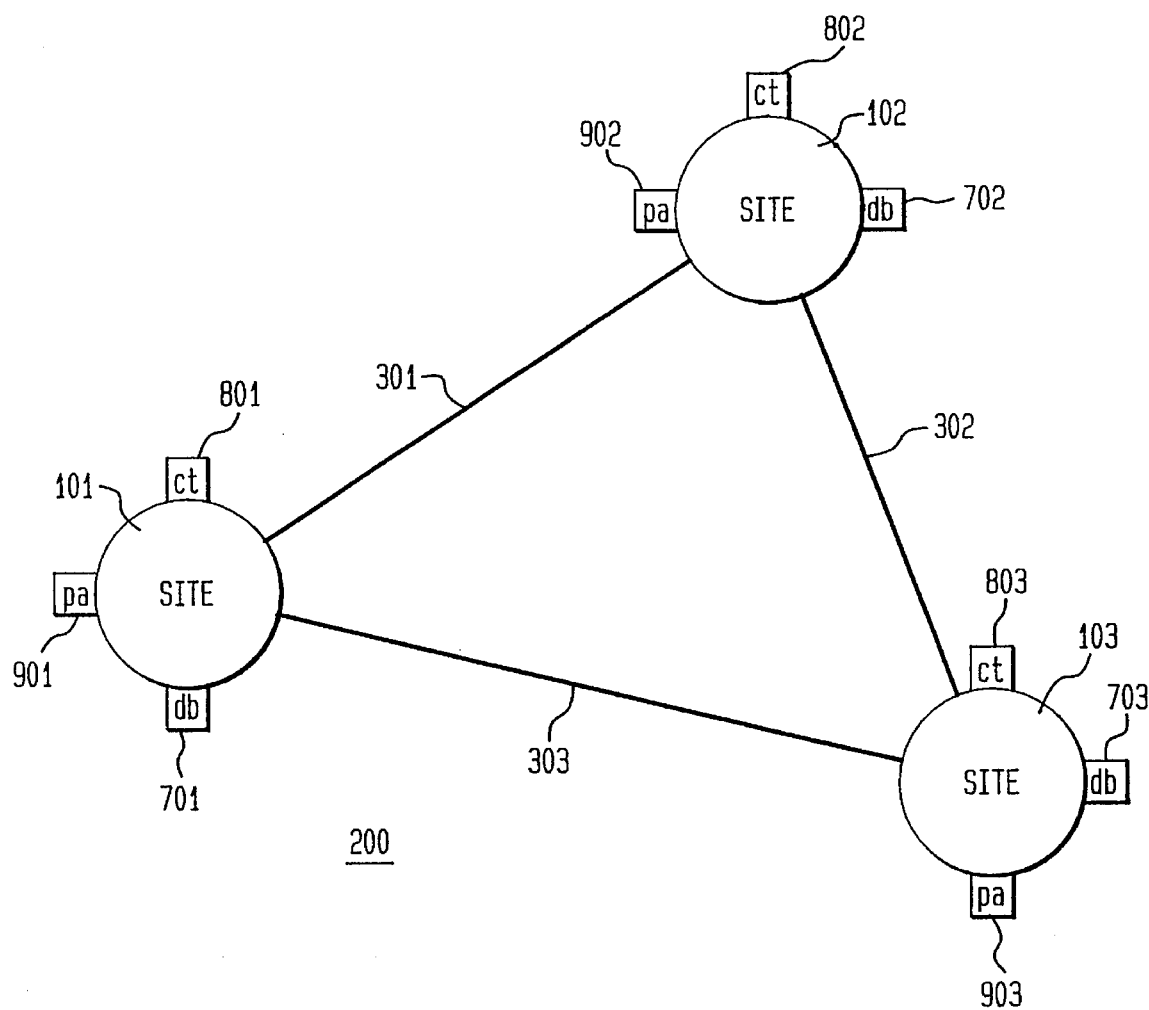
FIG. 1 shows a block diagram of a network of store and forward message system sites in a network.

FIG. 1 shows a block diagram of store and forward message system sites 101, 102, and 103 of network 200. As shown in FIG. 1, sites 101–103 are interconnected by communications links 301, 302, and 303. As is well known to those of ordinary skill in the art, network 200 may be comprised of a large number of sites (three being shown in FIG. 1 for purposes of illustration only) and each of communications links 301–303 may be any one of a large number of means of communication such as, for example, private dedicated lines, telephone or data communications lines which use the public switched telephone network, a private switching network wherein communications links are made utilizing private switching machines (PBXs), and so forth. Further, associated with each of sites 101–103 is a data base (db 701–703, respectively) for storing messages, distribution lists, user mailboxes, and the like, all of which are well known to those of ordinary skill in the art as being used in conventional store and forward messaging systems. Still further, each of sites 101–103 is comprised of means for communicating and transmitting messages (ct 801–803, respectively) to other sites in network 200. Lastly, each of sites 101–103 is comprised of processing apparatus (pa 901–903, respectively) which are well known to those of ordinary skill in the art for: (a) addressing messages for transmission to other sites in network 200 and (b) automatically distributing messages from a distribution list to message recipients identified by members thereof.

Figure 2:
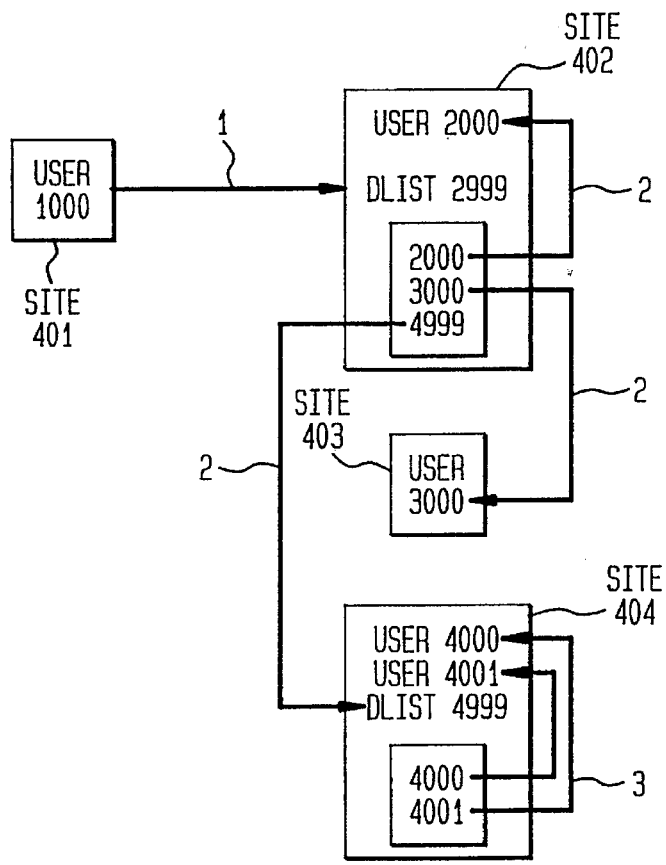
FIG. 2 shows, in pictorial form, a first message distribution scenario for the network shown in FIG. 1.

In order to understand the utility of the present invention, consider the following scenario. A user, working out of his/her mailbox at his/her home site in a network, creates a message and sends it to a distribution list defined at another site in the network. As is well known to those of ordinary skill in the art, a distribution list may be addressed in the same manner as any other user in the network is addressed. The distribution list contains, as members, among other things, distribution lists defined at still other sites in the network. As one can readily appreciate, the message will start "hopping" from site to site in the network, while possibly being distributed to some users at various sites in the network. FIG. 2 shows, in pictorial form, a first message distribution scenario for network 200 shown in FIG. 1 which illustrates the above scenario. As shown in FIG. 2, user 1000 at site 401, for example, an engineer in the United States of America, creates a message in a manner which is well known to those of ordinary skill in the art. Then, user 1000, in a manner which is well known to those of ordinary skill in the art, sends the message to a distribution list at site 402 having an address 2999, for example, in Europe (for ease of understanding, we refer to user 1000 sending a message, however, it is understood that such messages are sent from the mailbox of user 1000). At site 402, the message is distributed to: (a) local user 2000 at site 402 (for ease of understanding, we refer to user 2000 receiving a message, however, it is understood that such messages are received by the mailbox of user 2000); (b) user 3000 at site 403; and (c) distribution list 4999 at site 404, - - - all in a manner which is well known to those of ordinary skill in the art. Finally, at site 404, the message is distributed to users 4000 and 4001.

In accordance with the present invention, the following additional steps are taken to prevent infinite looping under the above-described scenario. As a message travels from site to site in network 200, if, at any point in such travels, it returns to a site that already "saw" this message once - - - including the originating site - - - the message will not be sent to any further destinations outside that site, i.e., the message will not be delivered to sites other than that site.

In accordance with the present invention, a new field is included in a data "envelope" used to transmit the message from site to site. Note that the term "envelope" is a term which is well known in the field of electronic mail to refer to message-specific information exchanged between communicating sites, such as, for example and without limitation, message creator, time of message creation, message recipient, and so forth. In accordance with the present invention, this new field comprises a list of all sites in the network that the message has "visited" and this field will be referred to below as the "VisitedSites" field. Referring to FIGS. 1 and 5, a VisitedSites field of a message generated at site 102 is formed by a VisitedSites circuit 904 that is part of the processing apparatus 902 of the site. Upon creation of a message, at a message circuit 906, the VisitedSites field is empty. Then, as the message is transmitted by the communicating and transmitting means 802 described above, from a message originating site to a first destination site, the originating site is added to the list. As the message then travels to the next site, the previous - - - or sending site - - - is added to the field, and so forth. In FIG. 5, this addition to the field is provided at site 102 by an update circuit 908 that is part of the processing apparatus of the site. Finally, if a message arrives at a site, and an examination of this field by an inhibit circuit 910 of the processing apparatus which comprises each site in the network shows that the message has already "visited" that site previously, the site is not permitted to transmit the message to other sites and only local addressees (if any) receive the message.

In a preferred embodiment of the present invention for use in a network which contains a predetermined maximum number of sites, the VisitedSites field is embodied as bit map. The bit map comprises a string of bits, for example, one bit per site, all of which bits are initially set, for example, to 0. Of course, those of ordinary skill in the art readily appreciate that any choice of bits may be utilized to indicate that a visit has or has not been made to a site in the network, and that parity bits may be used to provide error detection or correction if desired. As the message travels from site to site, bits corresponding to the sites are set, for example, to 1.

Figure 3:
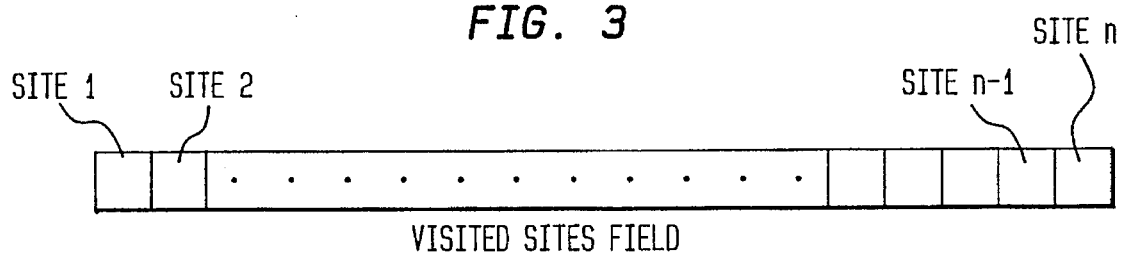
FIG. 3 shows, in pictorial form, a message data file formed in accordance with the present invention to prevent infinite loops.

FIG. 3 shows, in pictorial form, a message data file formed in accordance with the present invention to prevent infinite loops. As shown in FIG. 3, there is a field referred to as a VisitedSites field which is comprised of n groups of identification information, where n is the number of sites in the network. Each of the n groups is comprised of one or more bits which identify the sites in the network. As described above, for a field of fixed length, the identifier can be one bit where the $i^{th}$ bit in the field corresponds to the $i^{th}$ site in the network. However, in further embodiments of the present invention, the VisitedSites field, for example, can be a variable length list wherein each entry comprises an identifier of a visited site, i.e., an identifier of a "visited" site is appended to the list or is inserted into the list in a predetermined, indexed, or time-related order as a message is transmitted from a site or as the message is received by the recipient site. Note that the invention is indifferent as to whether the VisitedSites field is updated by the sending site or the receiving site, or even whether the field is not updated consistently across the network (although in that case the receiving site will need to ensure that the field is updated if the sending site did not update it already). This allows some multihops if not all sites in the network support multihop.

Figure 4:
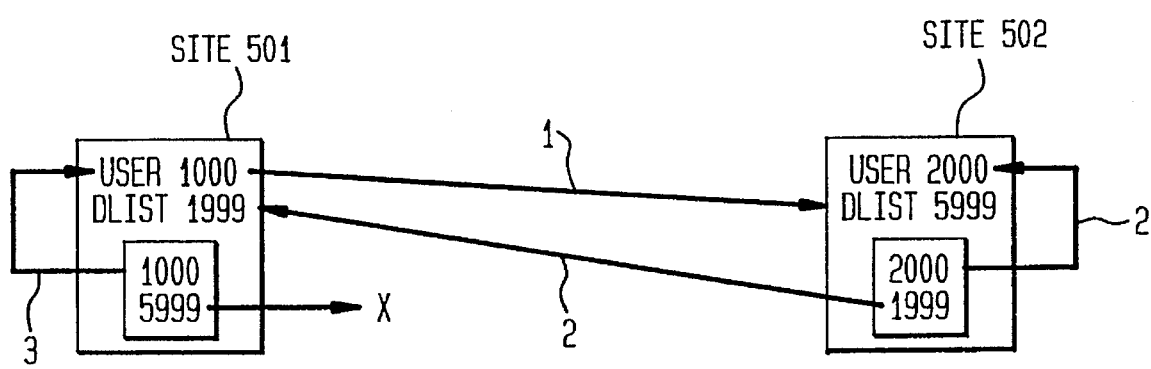
FIG. 4 shows, in pictorial form, a second message distribution scenario for the network shown in FIG. 1.

FIG. 4 shows, in pictorial form, a second message distribution scenario for network 200 shown in FIG. 1. As shown in FIG. 4, there are two sites. User 1000 at site 501 creates a message. At this time, the VisitedSites field is initialized to show that it is empty. Then, user 1000 addresses the message to distribution list 5999 at site 502. Next, the message is transmitted to site 502. As this occurs, the processing apparatus at site 501 (for example) sets the VisitedSites field to indicate that the message has visited site 501. As has been described above, setting the VisitedSites field may be done by setting an appropriate bit to 1 or 0 as the case may be or it may be done by appending an identifier for site 501 to a list or by inserting the identifier of site 501 into a list at a predetermined location. At site 502, the message is received and "expanded" in accordance with distribution list 5999. For example, in accordance with means which are well known in the art, the message is transmitted to the mailbox of local user 2000, i.e., the first member of distribution list 5999. Then, the message is sent to distribution list 1999 at site 501. However, as the message is retransmitted to site 501, the VisitedSites field is updated to include an identifier of site 502. Again, this may be done by setting another bit or by appending the identifier of site 502 to a list or by inserting the identifier of site 502 it into a list at a predetermined location. At site 501, the message is received and the message is expanded in accordance with distribution list 1999. In particular, the message is distributed to local user 1000 at site 501. However, the distribution of the message to distribution list 5999 is halted. This occurs because the processing apparatus at site 501 checks the VisitedSites field and discovers that this site has already been visited. Thus, in accordance with the present invention, no transmission is made to addressees who reside at other sites and a potential infinite loop has been successfully prevented.

In an alternative embodiment of the present invention, a master site is chosen in a network of store and forward messaging sites. A network message transmitted to a distribution list at the master site may be redistributed to destinations at any site. However, all other sites in the network have the following restrictions: (a) a network message received from another site to a distribution list can only be expanded to destinations at the local site of the distribution list and (b) there is a restriction on the maximum depth of nesting of distribution lists, i.e., how many times a message can be redistributed from one local distribution list to another. The latter restriction, i.e., restriction (b), is needed in all cases; otherwise a pair of local distribution lists could be in an infinite loop. In accordance with this alternative embodiment of the present invention, infinite loops are avoided since a message can be transmitted from any site to the master site and from there, in turn, to any other site; but no further. This alternative embodiment has the advantage that a single network administrator at a single site can create and maintain distribution lists which can be utilized by users at any site. The converse of this advantage may be a disadvantage for this alternative embodiment - - - if a user at an ordinary site (i.e., not at the master site) moves temporarily to another site, a locally maintained distribution list including the moved user would not work properly when addressed from a different site. Thus, the typical policy in such an alternative embodiment would be that all distribution lists are maintained at the master site.

In a further alternative embodiment, whenever a message is transmitted to or received from another site, the identifier of the receiving site is added to the VisitedSites field. Whenever a message is addressed via a distribution list to another site, transmission of the message is inhibited if the identifier of the receiving site is included in the VisitedSites field. This has the effect of allowing a message to be sent out twice from the originating site, but preventing the message from being received at any site more than once. This may be an advantage or a disadvantage. Note that in any embodiment, if at any time a message is addressed to more than one distribution list, the message is thereafter treated as a separate message to each distribution list: further modifications to the VisitedSites field will be independent for each of those separate messages.

Those skilled in the art will recognize that the foregoing description has been presented for the sake of illustration and description only. As such, it is not intended to be exhaustive or to limit the invention to the precise form disclosed. For example, modifications and variations are possible in light of the above teaching which are considered to be within the spirit of the present invention. Thus, it is to be understood that the claims appended hereto are intended to cover all such modification and variations which fall within the true scope and spirit of the invention.

What is claimed is:

1. Method for use in a network of store and forward messaging system sites for providing user access to messages by means of distribution lists, the members of which distribution lists are: (a) users and (b) other distribution lists, the method comprising the steps of:

(1) forming a user-generated message;

(2) creating and initializing a VisitedSites data field for transmission with said message;

(3) selecting a distribution list at a sending site for distribution of said message and said VisitedSites data field;

(4) before each transmission of said message from the sending site to a receiving site other than the sending site in accordance with said distribution list, determining whether the sending site is identified in the VisitedSites data field, and:

(a) if the sending site is not identified therein, updating the VisitedSites data field to identify the sending site and transmitting said message, the receiving site thereby becoming a sending site for subsequent transmissions; and (b) if the sending site is identified therein, inhibiting transmission of said message to the receiving site, while transmitting said message to users at the sending site that are members of said distribution list; and (5) for each said member in said distribution list which is an other distribution list, repeating step (4) for subsequent transmissions.

2. The method of claim 1 wherein the step of creating the VisitedSites data field comprises the step of creating a bit string having a predetermined number of bits for each of a predetermined number of store and forward messaging sites in the network.

3. The method of claim 2 wherein the predetermined number of bits for each of said predetermined number of store and forward messaging sites is one and the step of initializing the VisitedSites data field comprises the step of setting all of the bits in the VisitedSites data field to a predetermined value.

4. The method of claim 3 wherein the step of updating the VisitedSites data field comprises the step of setting a bit corresponding to the one site to another predetermined value.

5. The method of claim 1 wherein the step of creating the VisitedSites data field comprises the step of creating a variable length list having zero entries.

6. The method of claim 5 wherein the step of updating the VisitedSites data field comprises the step of adding an identifier of the one site to the variable length list.

7. The method of claim 1 wherein the step of updating and transmitting comprises the steps of updating and transmitting at the one site.

8. The method of claim 1 wherein the step of updating and transmitting comprises the steps of transmitting at the one site and updating at the other site.

9. Apparatus for use in a network of store and forward messaging system sites for providing user access to messages by means of distribution lists in the network, the members of which distribution lists are: (a) users and (b) other distribution lists, the apparatus including processing means at each network site, wherein said processing means includes:

means for generating a user-readable message having a data envelope;

means for creating and initializing a VisitedSites data field within said data envelope of said message when a user creates said message;

means for transmitting said message to said members of said network according to distribution lists;

means for, before transmitting said message from one site to an other site, determining whether the one site is identified in the VisitedSites data field of said data envelope, the means further comprising:

(a) means for updating the VisitedSites data field to identify the one site and for transmitting the message to the other site if the one site is not identified in the VisitedSites data field; and (b) means for inhibiting transmission of the message from the one site to the other site whenever the other site is different from the one site if the one site is identified in the VisitedSites data field, while leaving uninhibited any transmissions to users at said one site.

10. Apparatus for use in a network of store and forward messaging system sites for providing user access to messages by means of distribution lists in the network, the members of which distribution lists are: (a) users and (b) other distribution lists, the apparatus including processing means at each network site, wherein said processing means includes:

means for generating a user-readable message;

means for creating and initializing a VisitedSites data field within a data envelope of said message when a user creates said message;

means for transmitting said message to said members of said network according to said distribution lists;

means for, before transmitting a message from one site to an other site, determining whether the other site is identified in the VisitedSites data field of the data envelope, the means further comprising:

(a) means for updating the VisitedSites data field to identify the other site and for transmitting the message if the other site is not identified in the VisitedSites data field; and (b) means for inhibiting transmission of the message from the one site to the other site whenever the other site is different from the one site if the other site is identified in the VisitedSites data field, while leaving uninhibited any transmissions to users at said other site.

11. The apparatus of claim 10, further including means for allowing said message to be distributed locally to members of said first set of distribution lists at said one site, if said one site is identified in said VisitedSites data field.

12. Method for use in a network of store and forward messaging system sites for providing user access to messages by means of distribution lists, the members of which distribution lists are: (a) users and (b) other distribution lists located at the same or other network sites, the method comprising the steps of:

(1) forming a user-generated message;

(2) creating and initializing a VisitedSites data field for transmission with said message;

(3) selecting a first-addressed distribution list for distribution of said message and said VisitedSites data field;

(4) before each transmission of said message from the sending site to a receiving site other than the sending site in accordance with said distribution list, determining whether the receiving site is identified in the VisitedSites data field, and:

(a) if the receiving site is not identified therein, updating the VisitedSites data field to identify the receiving site and transmitting said message, the receiving site thereby becoming a sending site for subsequent transmissions; and (b) if the receiving site is identified therein, inhibiting transmission of said message from the sending site, while transmitting said message of other members of said distribution list; and (5) for each said member in said distribution list which is an other distribution list, repeating step (4) for subsequent transmissions.

13. The method of claim 12 wherein the step of updating and transmitting comprises the steps of updating and transmitting at the one site.

14. The method of claim 12 wherein the step of updating and transmitting comprises the steps of transmitting at the one site and updating at the other site.

15. The method of claim 12 wherein the step of creating the VisitedSites data field comprises the step of creating a bit string having a predetermined number of bits for each of a predetermined number of store and forward messaging sites in the network.

16. The method of claim 15 wherein the predetermined number of bits for each of said predetermined number of store and forwarding messaging sites is one and the step of initializing the VisitedSites data field comprises the step of setting all of the bits in the VisitedSites data field to a predetermined value.

17. The method of claim 16 wherein the step of updating the VisitedSites data field comprises the step of setting a bit corresponding to the other site to another predetermined value.

18. The method of claim 12 wherein the step of creating the VisitedSites data field comprises the step of creating a variable length list having zero entries.

19. The method of claim 18 wherein the step of updating the VisitedSites data field comprises the step of adding an identifier of the other site to the variable length list.

* * * * *